United States Patent [19]

Kimura et al.

[11] Patent Number: 4,565,065
[45] Date of Patent: Jan. 21, 1986

[54] EXHAUST-GAS PARTICLE TREATING DEVICE FOR INTERNAL-COMBUSTION ENGINE

[75] Inventors: Hideyuki Kimura; Hitoshi Tomita, both of Higashi-Matsuyama, Japan

[73] Assignee: Diesel Kiki Co., Ltd., Tokyo, Japan

[21] Appl. No.: 593,236

[22] Filed: Mar. 26, 1984

[30] Foreign Application Priority Data

Apr. 7, 1983 [JP] Japan .................................. 58-61265

[51] Int. Cl.⁴ ............................................... F01N 3/02
[52] U.S. Cl. ........................................ 60/285; 60/311; 123/447
[58] Field of Search ........................ 60/274, 285, 311; 123/447

[56] References Cited

U.S. PATENT DOCUMENTS 4,161,161 7/1979 Bastenhot ............................. 123/447
4,452,040 6/1984 Kobashi ................................. 60/274

FOREIGN PATENT DOCUMENTS 70619 1/1983 European Pat. Off. .............. 60/311
212362 12/1982 Japan .................................... 123/447

Primary Examiner—Douglas Hart
Attorney, Agent, or Firm—Wenderoth, Lind & Ponack

[57] ABSTRACT

This invention relates to an exhaust-gas particle treating device for burning the exhaust-gas particles contained in exhaust gas of an internal-combustion engine which is collected by a filter to be regenerated, and a needle valve lift limiting mechanism is provided in at least one of the fuel injection nozzles, and a fuel accumulating means is provided on an injecting pipe connected to the fuel injection nozzle by means of an electromagnetic switching valve, and also, a flow quantity control means is provided for controlling flow quantity from the fuel accumulating means to prolong the injection period of the fuel and to elevate the temperature of the exhaust gas.

11 Claims, 5 Drawing Figures

EXHAUST-GAS PARTICLE TREATING DEVICE FOR INTERNAL-COMBUSTION ENGINE

FIELD OF THE INVENTION

This invention relates to a device for prolonging the injection period in order to elevate the temperature of exhaust gas with a view to performing regeneration of the filter for filtering and collecting the exhaust-gas particles contained in the exhaust gas of an internal-combustion engine (particularly, a diesel engine).

BACKGROUND OF THE INVENTION

In diesel engines, since a large quantity of exhaust-gas particle is discharged, the idea has been proposed to provide a filter for preventing the discharge of the particles into the atmosphere, and the particles are collected by the filter. However, with respect to the filter, the ventilating resistance of the filter is increased as the accumulation of the particles on the surface of the filter progresses so that means is employed to heat the collected particles and to burn and remove them whereby the filter is regenerated.

As a heating means for the regeneration of the filter, such a means was described, for example, in the official gazette of Japanese Patent Laid-open Publication No. 58-124618 as prior art literature which was adopted to elevate the temperature of exhaust gas and also to raise the HC density.

This prior art literature described the means for delaying the fuel injection period and then to burn it thereby to elevate the temperature of exhaust gas but the delay occurred on all the cylinders so that there was a drawback of a large reduction of output in the operation of regeneration of the filter. Also, although this prior art could be applied to a distributor type fuel injection pump, there was a drawback that it could not be applied to an in-line pump.

SUMMARY OF THE INVENTION

An object of this invention is to elevate the temperature of exhaust gas by prolonging the fuel injection period.

Another object of this invention is to control the length of the fuel injection period.

A further object of this invention is to limit the function of extending the fuel injection period to a desired number of cylinders.

Yet another object of this invention is to make this invention applicable not only to a distributor type fuel injection pump but also to an in-line pump.

For these objects, the gist of this invention resides in that in an exhaust-gas particle treating device for an internal-combustion engine in which a filter for collection of exhaust-gas particles is provided in an exhaust-gas system of a diesel engine, and the filter is regenerated by burning the exhaust-gas particles collected in the filter, an improved exhaust-gas particle treating device is provided in which a needle valve lift limiting mechanism is provided in at least one of the fuel injection nozzles, and a pressure accumulating means is provided on an injection pipe connected to the fuel injection nozzle by means of a switching valve of an electromagnetic type.

Accordingly, when the pressure is increased by the fuel injection pump and the fuel is accumulated in the pressure accumulating means whereby the pressure in the injection pipe is smoothed, the injection rate can be held down to a low rate since the needle valve lift limiting mechanism is provided, and even after the completion of pressure feeding of the fuel, the fuel accumulated in the pressure accumulating means is discharged, and as a result, the pressure feeding period of the fuel is prolonged and also, since the discharge of the fuel accumulated in the pressure accumulating means is carried out by the flow quantity control means for controlling the flow of the pressure, the injection period can be prolonged, and furthermore, it can be applied only to the desired cylinders.

DETAILED DESCRIPTION OF THE INVENTION

Figure 1:
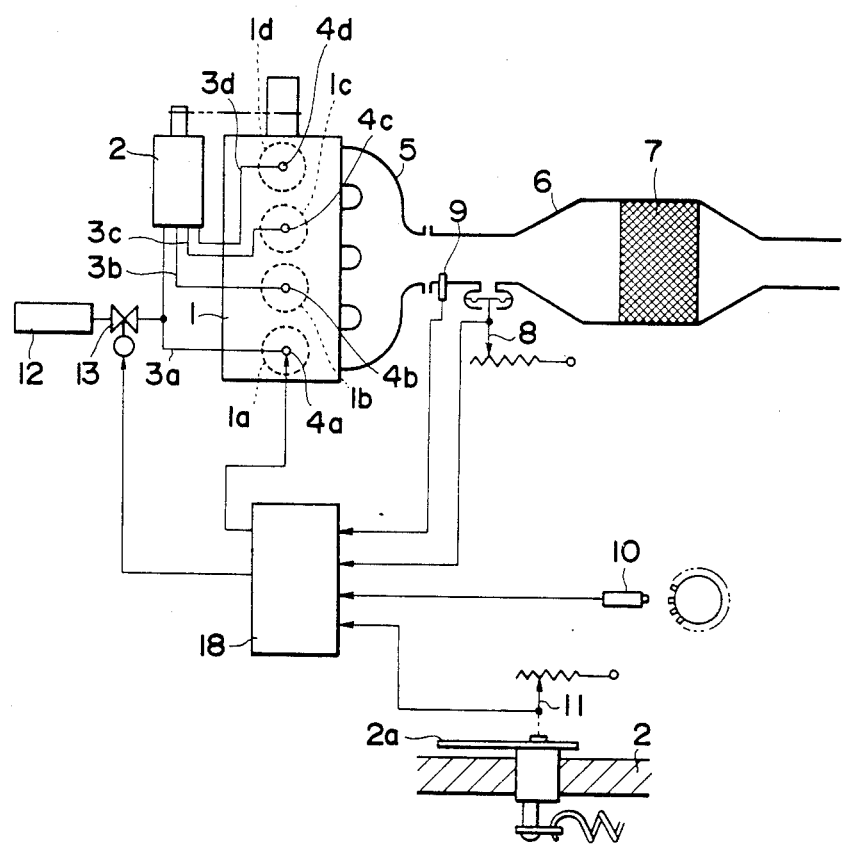
FIG. 1 is a block diagram showing an embodiment of this invention.

Hereinbelow, the embodiment of this invention will be described by referring to the drawings.

Figure 2:
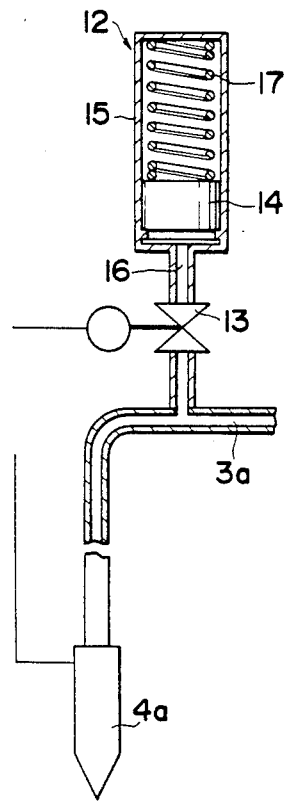
FIG. 2 is a cross sectional view of an enlarged essential portion of the embodiment of this invention.

In FIGS. 1 and 2, the schematic drawings of this invention are shown in which reference numeral 1 denotes a diesel engine proper of a vehicle, and the air is sucked through an air cleaner, an intake pipe, intake manifold, and the fuel is injected by the distributor type fuel injection pump 2 of the Bosch type that distributes and injects the fuel by the rotation and reciprocation of the fuel injection pump, for example, a plunger in this embodiment by means of each injection pipe 3a, 3b, 3c, 3d. The fuel injected from each injection nozzle 4a, 4b, 4c, 4d is ignited in each cylinder 1a, 1b, 1c, 1d, and is burnt and the combustion energy as the mechanical energy rotates the engine and the combustion gas is discharged from an exhaust pipe through an exhaust manifold 5.

In the exhaust pipe 6, a filter 7 is provided for collecting the exhaust-gas particles in the exhaust gas, and the filter 7 is formed of, for example, porous ceramics or the like. Also, in the exhaust pipe 6, an exhaust-pressure detector for detecting exhaust pressure in the exhaust pipe, and an exhaust-gas temperature detector 9 for detecting the temperature of exhaust gas in the exhaust pipe are respectively provided, and an input is applied to a control circuit 18 to be described hereinafter by electric signals (resistance value changes) from these detectors 8 and 9.

A revolution detector 10 detects the revolution of the engine and a load detector 11 detects the rotary angle of a speed lever 2a of the distributor type fuel injection pump 2 as an electric signal (resistance value change), and these detected signals are inputted to the control circuit 18 to be described hereinafter.

The pressurized fuel for injection is injected by a selected injection nozzle 4a among the injection nozzles 4a, 4b, 4c, 4d, and this injection nozzle 4a is provided with a needle valve lift limiting mechanism of the known construction for throttling the aperture area by electromagnetic force, and an accumulator 12 is provided in the injection pipe 3a connected to the injection nozzle 4a provided with the needle valve lift limiting mechanism by means of a valve (hereinafter referred to as an electromagnetic valve) to be switched by the electromagnetic force.

The accumulator 12 performs the operation of temporarily accumulating the fuel, and for example, the construction is shown in FIG. 2, and a piston 14 is housed in a cylindrical accumulator proper 15, and is energized by a spring 17 disposed at an opposite side of a flow inlet 16. Accordingly, when the pressure of the fuel exceeds the set force of the spring, the piston 14 is displaced against the resistance of the spring 17, and the fuel is accumulated in the accumulator 12.

The control circuit 18 is to control the throttling of the aperture area of the injection nozzle 4a provided with the needle valve lift limiting mechanism, and the switching of the electromagnetic valve 13, and the ventilating resistance of the filter is increased by the accumulation of the particles as the exhaust-gas particles in the exhaust gas are collected by the filter 7, and when the collection of the exhaust-gas particles reaches a desired value, namely, a predetermined quantity, the opening signals are outputted to the injection nozzle 4a provided with the needle valve lift limiting mechanism and the electromagnetic valve 13. This opening signal is continued until a predetermined exhaust pressure is reached.

In addition to the exhaust pressure, the temperature of the exhaust gas, revolutions or load signal are inputted to the control circuit 18, but if necessary, this may be used in addition to the foregoing conditions, for example, it is used for cutting off the foregoing control in a low rotation zone at an idling time.

In the foregoing construction, the rotation and the reciprocation of the plunger are caused by the drive force of the engine, and thereby the fuel is sucked and compressed, and is sequentially pressure fed to the respective injection nozzles 4a, 4b, 4c, 4d by means of the injection pipes 3a, 3b, 3c, 3d, and the fuel is injected into the cylinders 1a, 1b, 1c, 1d.

The exhaust-gas particles discharged from the engine by the operation of the engine are collected by the filter 7, and the adhesion of the exhaust gas is gradually increased, and the filter 7 is frequently clogged which causes trouble to the normal flow of the exhaust gas. As a result, the exhaust pressure in the exhaust pipe 6 is increased, and the fact that the collection of the exhaust-gas particles reaches a predetermined quantity is detected by means of the exhaust pressure, and when the conditions such as the temperature of exhaust gas (above 300° C.), the revolutions (excluding the idling) which are the conditions to be added if necessary, the drive signals are outputted to the injection nozzle 4a provided with the needle valve lift limiting mechanism and the electromagnetic valve from the control circuit 18, and the needle valve lift of the injection nozzle 4a is limited for decreasing the aperture area, and the electromagnetic valve 13 is changed over from the closed to the open condition of the valve. As a result, a part of the pressurized fuel from the injection pump 2 flows into the accumulator 12 by means of the flow inlet 16, and the piston 14 is displaced against the spring 17, and the fuel is accumulated in the accumulator. For this reason, the pressure in the injection pipe 3a is smoothed to a desired value, and the injection rate from the injection nozzle 4a is lowered, and the pressure in the injection pipe 3a is retained at a desired value until the fuel accumulated in the accumulator 12 is discharged even after the completion of the pressure feeding of the fuel from the injection pump, and the condition becomes the same as if the pressure feeding period of fuel is prolonged as a result thereof, and the injection period can be prolonged to the characteristic shown with the solid line in FIG. 3 from the characteristic shown with the dotted line. Accordingly, the temperature of the exhaust gas can be elevated and the exhaust-gas particles collected in the filter 7 can be ignited and burnt.

Figure 3:
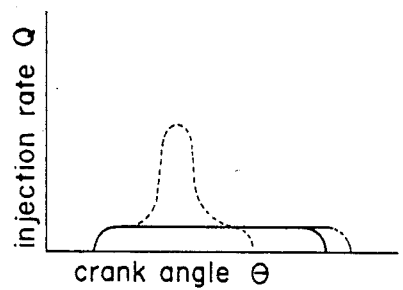
FIG. 3 is a characteristic schematic drawing of this invention.
Figure 4:
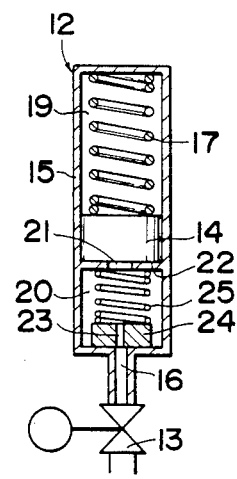
FIG. 4 is a cross sectional view of an accumulator according to another embodiment of the invention.
Figure 5:
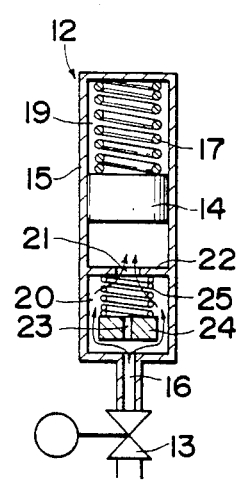
FIG. 5 is a view similar to FIG. 4 showing a condition in which fuel flows into the accumulator.

In FIGS. 4 and 5, another embodiment of this invention is shown. This embodiment is created for the object of prolonging the injection period, and the accumulator 12 is provided with a piston housing chamber 19 in which the piston 14 is housed and which has a diaphragm 22 having a hole 21 in the center and a chamber 20 in which a valve 24 having an orifice 23 in the center toward the connection opening 16 thereof, and the valve 24 housed in the chamber 20 is urged by a spring 25 toward the connection opening 16 to close it. The valve 24 is so constructed that the diameter is considerably smaller than the inside diameter of the chamber 20. Accordingly, the part of the pressurized fuel to be supplied from the injection pump flows in the direction of the arrows by lifting the valve 24 having the orifice and flows into the accumulator 12, and the fuel is accumulated in the accumulator 12. As a result, the pressure in the injection pipe 3a is smoothed to a desired value, and the lowering of the injection rate from the injection nozzle 4a is similar to that of the first embodiment, but the discharge of the fuel accumulated in the accumulator 12 after the completion of the pressure feeding of the fuel from the injection pump is carried out through the orifice 23 since the flow inlet 16 of the valve 24 having the orifice 23 is closed by the change of the pressure difference. For this reason, when the diameter of the orifice 23 is selected properly, the discharge quantity can be controlled and the injection period can be extended further than that of the first embodiment. The characteristic is shown in FIG. 3 by the two-point dotted line. With respect to other points, they are similar to the first embodiment so that identical numbers are used and the description thereof is omitted.

As described in the foregoing, according to this invention, the injection nozzle with the needle valve lift limiting mechanism is caused to work, and a part of the pressurized fuel from the injection pump is accumulated in the accumulator, and for the proper discharge of the accumulated fuel, the injection period can be prolonged. Also, by controlling the discharge rate of the fuel accumulated in the accumulator by the valve 23 provided with the orifice, the injection period can be further prolonged.

Furthermore, the function of extending the injection period can be limited to the desired cylinders, and even in the operation of regeneration of the filter, a reduction of output is not produced and safety in the feeding can be assured. Furthermore, this invention can be applied not only to a distributor type fuel injection pump but also to an in-line pump.

What is claimed is:

1. In an exhaust gas particle treating device for an internal combustion engine having fuel injection nozzles and fuel supplying pipes connected thereto and in which a filter for collection of exhaust gas particles is provided in the exhaust gas system thereof, and the filter is regenerated by burning the exhaust gas particles collected in the filter, the improvement comprising:

a needle valve lift limiting mechanism in at least one of the fuel injection nozzles;

a pressurized fuel accumulating means connected to the injection pipe connected to said one fuel injection nozzle; and an electromagnetically operated switching valve connected between said fuel accumulating means and the injection pipe.

2. The improvement as claimed in claim 1 in which said fuel accumulating means has a flow inlet and outlet, and said improvement further comprising a flow quantity control means in said fuel accumulating means for controlling the quantity of the fuel flowing from said fuel accumulating means through the flow inlet and outlet, and said flow quantity control means including means responsive to the pressure of the fuel flowing to said one fuel injection nozzle to admit fuel to said fuel accumulating means, and orifice means to control the flow of the fuel out of said fuel accumulating means.

3. The improvement according to claim 1 in which said needle valve lift limiting mechanism comprises electromagnetic means for moving the needle valve thereof.

4. The improvement according to claim 2 in which said needle valve lift limiting mechanism comprises electromagnetic means for moving the needle valve thereof.

5. The improvement as claimed in claim 1 in which the switching valve is an electromagnetic valve.

6. The improvement as claimed in claim 2 in which the switching valve is an electromagnetic valve.

7. The improvement as claimed in claim 1 in which said fuel accumulating means is an accumulator.

8. The improvement as claimed in claim 2 in which said fuel accumulating means is an accumulator.

9. The improvement as claimed in claim 7 in which said accumulator comprises a housing, a piston slidable in said housing under pressure of the accumulated fuel, and spring means resisting the movement of said piston in said housing.

10. The improvement as claimed in claim 8 in which said accumulator comprises a housing, a piston slidable in said housing under pressure of the accumulated fuel, and spring means resisting the movement of said piston in said housing.

11. The improvement as claimed in claim 2 in which said orifice means is a valve member having an orifice therein and aligned with said inlet and outlet, and said means responsive to the pressure of the fuel is a spring.

* * * * *